United States Patent
Holdampf et al.

(10) Patent No.: US 6,364,347 B1
(45) Date of Patent: Apr. 2, 2002

(54) SELF LOCKING FASTENER

(75) Inventors: Carl J. Holdampf, Farmington Hills; Robert I. Homier, Plymouth; Matthew M. Bednarski, Brighton, all of MI (US)

(73) Assignee: Magne Seating Systems Inc., Aurora (CA)

( * ) Notice: Subject to any disclaimer, the term of this patent is extended or adjusted under 35 U.S.C. 154(b) by 0 days.

(21) Appl. No.: 09/517,393

(22) Filed: Mar. 2, 2000

Related U.S. Application Data
(60) Provisional application No. 60/123,046, filed on Mar. 5, 1999.

(51) Int. Cl.$^7$ .............................................. B60R 21/22
(52) U.S. Cl. ............................. 280/730.2; 280/728.1; 280/728.2; 280/730.1; 280/733; 280/743.1; 403/364; 24/575
(58) Field of Search ........................... 280/728.1, 728.2, 280/730.1, 730.2, 733, 743.1; 24/577, 575, 576, 587; 403/364, 340

(56) References Cited

U.S. PATENT DOCUMENTS

| | | | |
|---|---|---|---|
| 3,167,836 A | * 2/1965 | Walter | 24/265 |
| 4,078,279 A | * 3/1978 | Heimberger | 24/205.11 R |
| 4,350,409 A | * 9/1982 | Kate et al. | 339/186 M |
| 4,682,366 A | * 7/1987 | Ausnit et al. | 383/65 |
| 4,682,839 A | * 7/1987 | Bryce | 439/598 |
| 4,709,976 A | * 12/1987 | Nakama et al. | 439/350 |
| 4,758,182 A | * 7/1988 | Anbo et al. | 439/592 |
| 5,044,994 A | * 9/1991 | Van Woensel | 439/681 |
| 5,074,584 A | 12/1991 | Jarboe | |
| D324,671 S | * 3/1992 | Kawashima et al. | D13/147 |
| 5,344,113 A | * 9/1994 | Jurek | 248/316.7 |
| 5,361,462 A | * 11/1994 | Murasaki | 24/452 |
| 5,533,750 A | 7/1996 | Karlow et al. | |
| 5,542,691 A | 8/1996 | Marjanski et al. | |
| 5,588,670 A | 12/1996 | Storey et al. | |
| 5,588,671 A | 12/1996 | Boumarafi et al. | |
| 5,597,176 A | 1/1997 | Kikuchi | |
| 5,608,952 A | * 3/1997 | Wilder | 24/433 |
| 5,678,853 A | 10/1997 | Maly | |

(List continued on next page.)

FOREIGN PATENT DOCUMENTS

| DE | 2293355 | 3/1996 |
|---|---|---|
| EP | 0926014 | 6/1999 |

OTHER PUBLICATIONS

Magna Lomason Corporation PCT Application WO 98/21063, dated May 22, 1998.

Magna Seating Systems, Inc. PCT Transmittal of Search Report dated Jun. 27, 2000, International Application No. PCT/CA00/00232.

*Primary Examiner*—Lanna Mai
*Assistant Examiner*—Paul Royal, Jr.
(74) *Attorney, Agent, or Firm*—Howard & Howard

(57) ABSTRACT

The invention provides the combination of a seat frame, a cover, having a seam, covering the seat frame. An air bag unit is disposed inside the cover and is mounted to the frame. A pair of intensifier sheets sandwich the air bag unit there between. Each of the sheets has a first edge connected to the seam and a second edge supported by the seat frame. The combination is characterized by an interlocking fastener having outboard and inboard portions mechanically interlocked with the outboard portion connected to one of the second edges and the inboard portion connected to the other of the second edges. Each of the outboard and inboard portions includes a back panel extending in a strip between opposite ends. A plurality of J-shaped hooks are disposed in side by side relationship between the opposite ends. A plurality of slots separate adjacent J-shaped hooks and support ribs extend from the back panel and support each of the J-shaped hooks.

29 Claims, 4 Drawing Sheets

U.S. PATENT DOCUMENTS

| | | | |
|---|---|---|---|
| 5,799,970 A | * 9/1998 | Enders | 280/730.2 |
| 5,810,389 A | 9/1998 | Yamaji et al. | |
| 5,816,610 A | 10/1998 | Higashiura et al. | |
| 5,833,263 A | 11/1998 | Wittmann et al. | |
| 5,876,060 A | 3/1999 | Davidson et al. | |
| 5,890,733 A | 4/1999 | Dillon | |
| 5,895,070 A | 4/1999 | Crimmins et al. | |
| 5,927,749 A | 7/1999 | Homier et al. | |
| 5,967,546 A | 10/1999 | Homier et al. | |
| 5,967,603 A | 10/1999 | Genders et al. | |
| 5,984,566 A | * 11/1999 | Blaha | 403/364 |

* cited by examiner

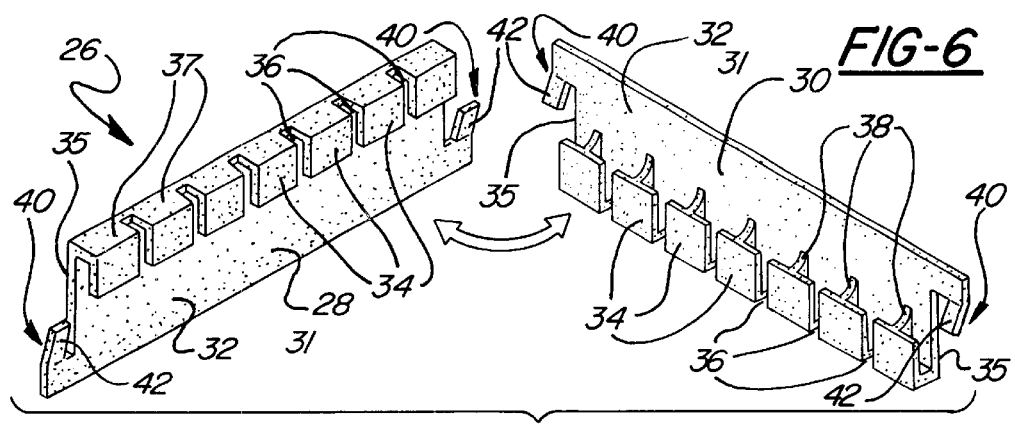
FIG-6
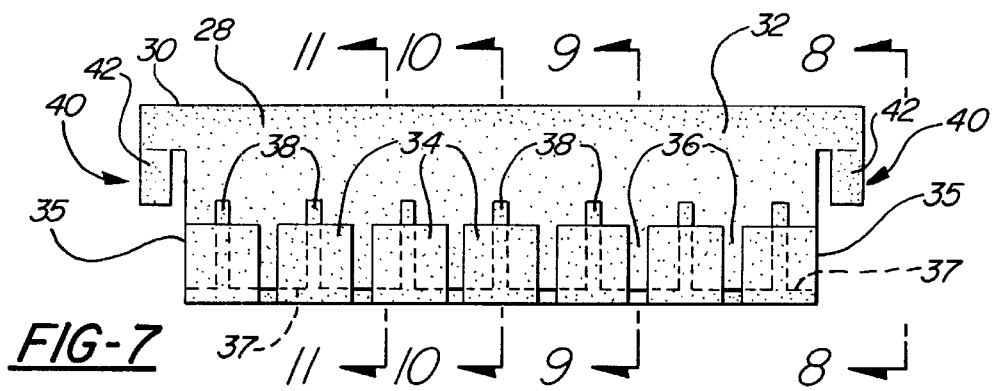
FIG-7
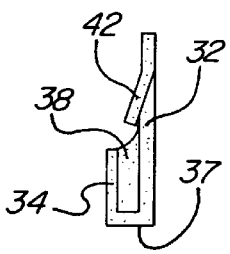 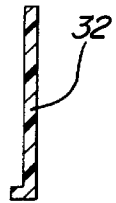 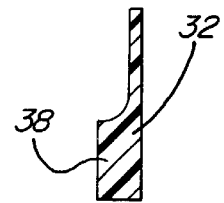 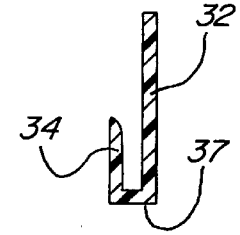
FIG-8  FIG-9  FIG-10  FIG-11
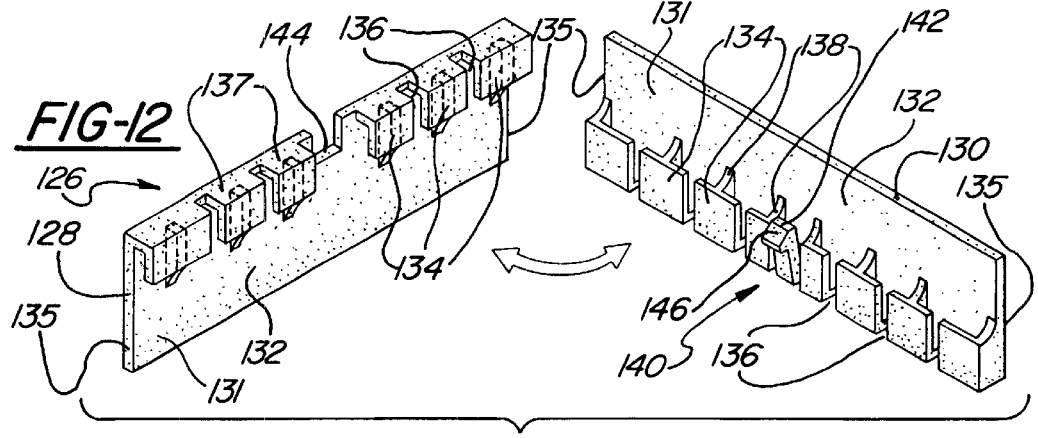
FIG-12

SELF LOCKING FASTENER

RELATED APPLICATION

The subject patent application claims priority to and all the benefits of U.S. Provisional Patent Application Ser. No. 60/123,046 which was filed on Mar. 5, 1999 and entitled "Self Locking Fastener".

FIELD OF THE INVENTION

The subject invention relates to a seat assembly for a vehicle including a side air bag unit and, more specifically, to an interlocking fastener for securing an intensifier sleeve surrounding the air bag unit.

BACKGROUND OF THE INVENTION

Side impact air bag units that inflate an air bag laterally or to the side of a seat assembly are well known in the prior art. The seat assemblies typically include a seat cover sewn together from a number of separate trim pieces for encapsulating the seat frame and the air bag unit. During deployment of the air bag, the air bag exists through one of the seams in the trim cover.

An intensifier sleeve is frequently used to guide the air bag during deployment. In particular, intensifier sleeves include a pair of sleeve sheets sandwiching the air bag therebetween. Each of the sheets presents a first edge and a second edge. The first edges are sewn into the seam of the trim cover. The second edges are supported by the seat frame. The intensifier sleeve therefore directs the air bag toward the seam of the trim cover such that the air bag will correctly and completely deploy through the seam. An example of such a prior art seat assembly is disclosed in U.S. Pat. No. 5,967,546 to Homier et al., two of the same inventors named herein.

Side impact air bag units employing an intensifier sleeve are housed within a relatively small area in the side of the seat assembly. During the installation of the intensifier sleeve and air bag unit, it is frequently a challenge to accurately and securely mount the intensifier sleeve to the seat frame. A number of different installation techniques have been developed. One basic method of supporting the intensifier sleeve is disclosed in U.S. Pat. No. 5,588,670 to Storey et al., which merely discloses a pair of basic clamps. These clamps do not provide an easy, quick and error free installation of the intensifier sleeve. Another design for supporting the intensifier sleeve is disclosed in U.S. Pat. No. 5,967,546 to Homier et al.. The Homier '546 patent discloses a wire interconnecting two distal ends of the sleeve opposite the seam of the trim cover. This method of attachment, however, may be cumbersome, difficult and time consuming to install considering the confined spaces of the seat assembly.

An object of this invention is to provide a seat assembly including an air bag unit having an intensifier sleeve that can be quickly and easily supported by a seat frame. Another object of this invention is to provide a seat assembly including an air bag unit having a fastener means that ensures that an intensifier sleeve is correctly attached to a seat frame.

SUMMARY OF THE INVENTION AND ADVANTAGES

A seat assembly for a vehicle comprising a seat frame and a cover that covers the seat frame. The cover has a seam. An air bag unit is disposed inside the cover. The air bag unit includes an air bag disposed between a pair of sheets of an intensifier sleeve. Each sheet has a first edge and a second edge. The first edge is connected to the seam of the cover. The assembly is characterized by an interlocking fastener having outboard and inboard portions each of which are connected to one of each of the second edges. The inboard and outboard portions are mechanically interlocked with the second edges disposed about the seat frame such that the intensifier sleeve is supported by the seat frame.

Accordingly, the subject invention provides a seat assembly including an air bag unit having a fastener that enables an intensifier sleeve to be quickly, easily and properly supported by a seat frame.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a perspective view of the fastener having outboard and inboard portions;

FIG. 7 is a front view of the inboard portion of the fastener shown in FIG. 6;

FIG. 8 is an end view of the fastener taken along line 8—8 of FIG. 7;

FIG. 9 is a sectional view taken along line 9—9 of FIG. 7;

FIG. 10 is a sectional view taken along line 10—10 of FIG. 7;

FIG. 11 is a sectional view taken along line 11—11 of FIG. 7; and

FIG. 12 is a perspective view of an alternative embodiment of the fastener.

DETAILED DESCRIPTION OF THE PREFERRED EMBODIMENT

Figure 1:
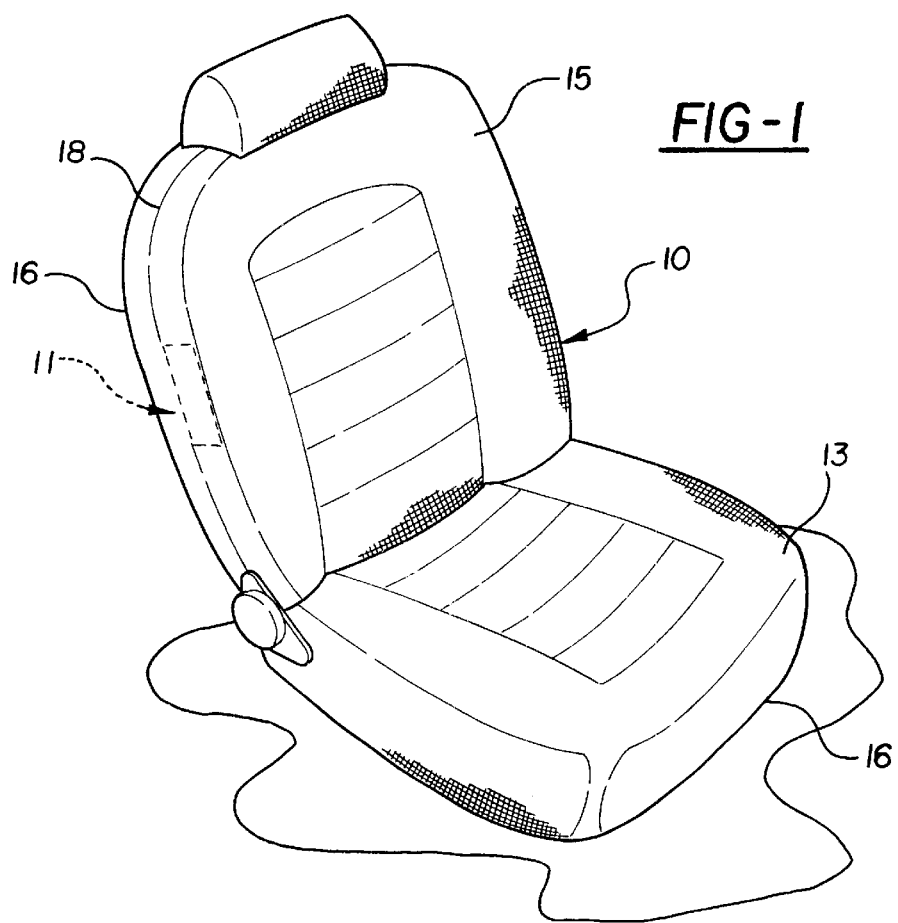
FIG. 1 is a perspective view of a vehicle seat assembly according to this invention incorporating a side impact air bag unit.

Referring to the Figures, wherein like numerals indicate like or corresponding parts throughout the several views, a vehicle seat assembly is generally shown at 10 in FIG. 1. The seat assembly 10 includes a side impact air bag unit 11. The air bag unit 11 illustrated deploys from the side or bolster section of the seat assembly 10 in order to protect the occupant from side impacts. As will be appreciated, the subject invention may be used for other air bag unit configurations and locations.

The seat assembly 10 also includes a seat cushion 13 and a seat back 15 with both the cushion 13 and back 15 covered by a cover 16. The cover 16 may be of any suitable material such as cloth, leather, vinyl or the like. As is known in the seat manufacturing art, the covers 16 is typically formed of a number of separate trim pieces which are sewn together defining a plurality of seams 18. In particular, the seams 18 are defined by stitches 19. As will be appreciated, the subject invention is by no way limited to a particular type, style or design of seat assembly 10.

Figure 2:
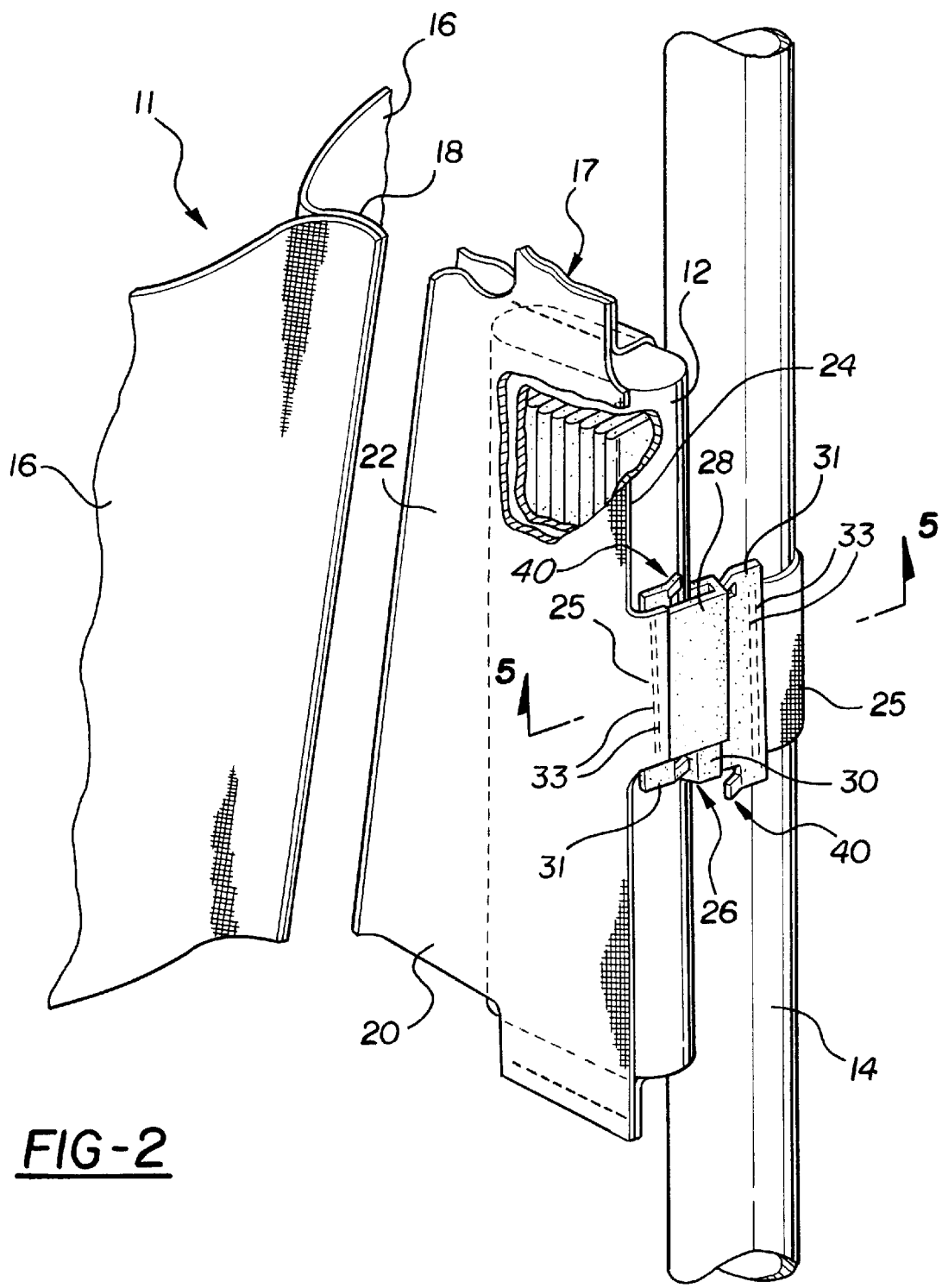
FIG. 2 a fragmentary perspective view of the side impact air bag unit incorporating an interlocking fastener of the subject invention.
Figure 3:
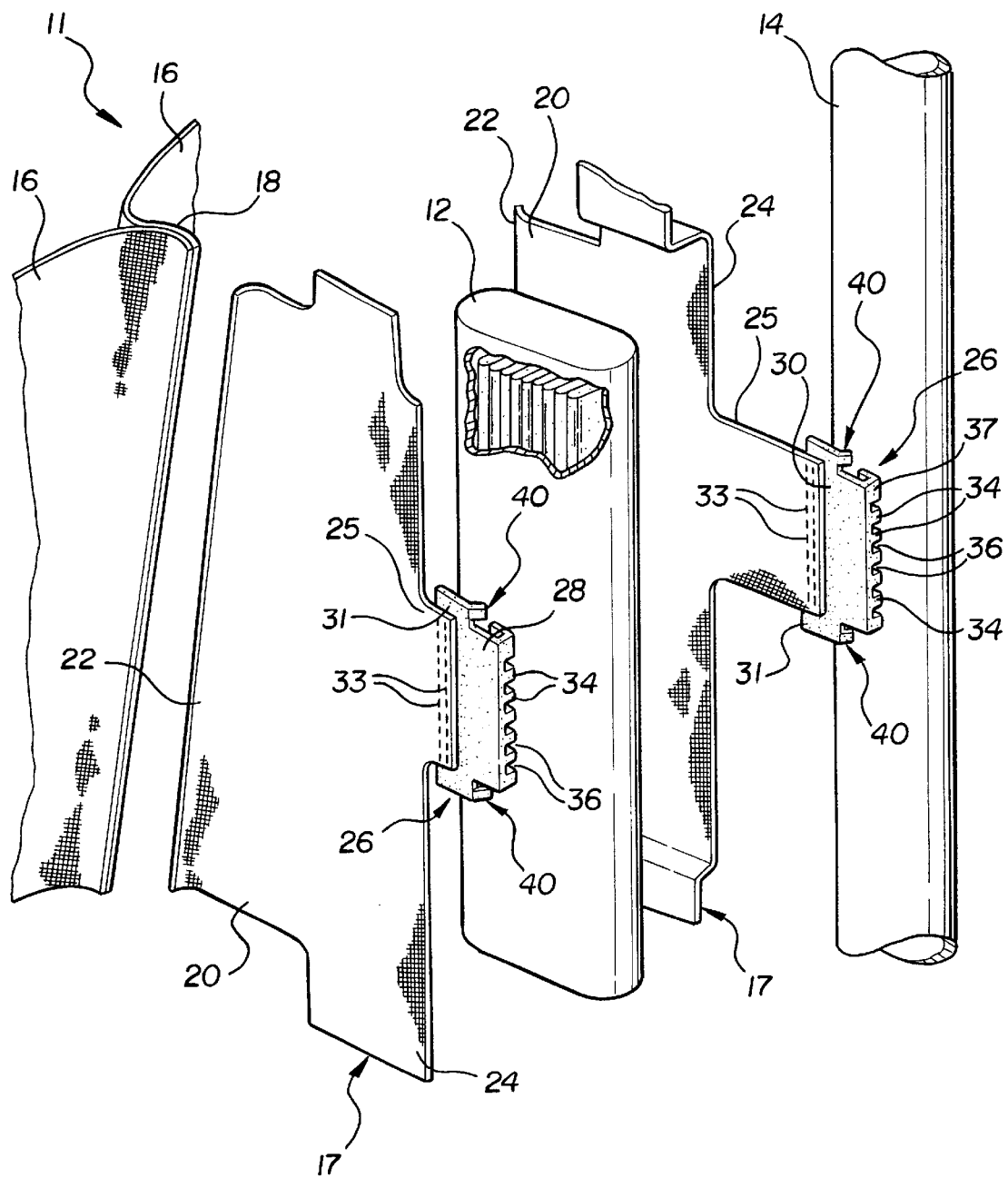
FIG. 3 is a view similar to FIG. 2 with the components thereof in an exploded relationship.

Referring to FIGS. 2 and 3, the air bag unit 11 includes an air bag canister 12 which is mounted to a seat frame 14. The seat frame 14 is shown as a tubular member. Alternatively, the seat frame 14 may be of any suitable construction. The seat frame 14 is part of an overall seat frame that forms corresponding parts of the seat cushion 13 and seat back 15.

The air bag canister 12 of the subject invention includes an opening (not shown) wherein an air bag (not shown) is designed to deploy through the cover 16 covering the seat frame 14. Specifically, the air bag is designed to deploy through the seam 18 defined by the stitch 19 connecting two pieces of the cover material 16. The particular design, size or configuration of the air bag canister 12 and air bag are in no way limited by the illustrated embodiment.

An intensifier sleeve 17 surrounds the opening and the air bag to direct the air bag into the seam 18 of the cover 16. The intensifier sleeve 17 is defined by two sheets or pieces 20 wherein each piece or sheet 20 has a first end or edge 22 and a second end or edge 24.

Figure 4:
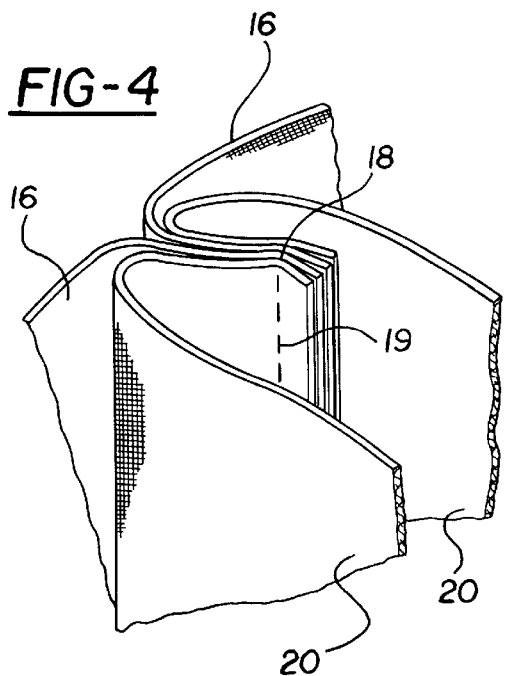
FIG. 4 is an enlarged fragmentary perspective view of a portion of an intensifier sleeve stitched into a seam of a trim cover.

For illustrative purposes, FIGS. 2 and 3 show the seam 18 of the cover 16 in a spaced relationship from the first ends 22 of the sleeve sheets 20. As appreciated, the first ends 22 of the sheets 20 would be stitched together in a sandwiched fashion with the seam 18 on the cover 16. The preferred stitching configuration is best shown in FIG. 4. The sheets 20, however, may be affixed to the seam 18 of the cover 16 by any suitable means.

The sheets 20 of the intensifier sleeve 17 are preferably made of a nylon type material which is stronger than the stitch 19 of the cover 16 and the air bag itself. The strength of the sheets 20 is particularly important during the deployment of the air bag.

During deployment, the air bag expands in a quick and volatile manner. The intensifier sleeve 17 directs the air bag toward the seam 18 of the cover 16. The expansion forces load the sheets 20 of the intensifier sleeve 17 in tension such that the seam 18 of the cover 16 tears open as the stitch 19 breaks. This opens a path for the air bag to follow as the air bag emerges from the seat assembly 10 to a fully deployed position. This type of deployment is known in the art as is discussed in the background section.

Due to the volatile nature of the air bag deployment, the sheets 20 of the intensifier sleeve 17 should be securely supported by the seat frame 14. Preferably, the second ends 24 of the two sheets 20 each include extensions or tabs 25 which extend around the air bag canister 12 and are connected together around the seat frame 14. As illustrated, one of the extensions 25 may be longer than the other extension 25 in order to surround the desired portion of the seat frame 14.

An interlocking or self-locking fastener, generally shown at 26, securely supports the two second ends 24 of the intensifier sleeve 17 around the seat frame 14. As will be appreciated, the fastener 26 may be used in a variety of environments and the side impact air bag unit 11 is simply illustrative of one environment. Other environments may include different air bag unit configurations, air bag unit positions, seat trim attachments around seat cushions and seat backs, and/or cover attachments.

The fastener 26 includes an elongated outboard portion 28 and an elongated inboard portion 30 which interlock together. Preferably, the outboard 28 and inboard 30 portions are identical to each other which reduces the possibility of installation error. The portions 28, 30, however, are in no way limited to being identical, such as will be discussed in greater detail below with reference to an alternative embodiment.

Referring also to FIGS. 5 through 11, the preferred embodiment of the outboard 28 and inboard 30 portions is shown in greater detail. The inboard 30 and outboard 28 portions each include a back panel 32 extending in a strip between opposite distal ends 35. A plurality of J-shaped hooks 34 preferably extend across the entire length of and between the ends 35 of each back panel 32. Preferably, the J-shaped hooks 34 are disposed in a side by side relationship between the opposite ends 35. The back panels 32 have upper and lower edges with the upper edge extending beyond the J-shaped hooks 34 to provide a flat connecting section 31 along the upper edge.

Figure 5:
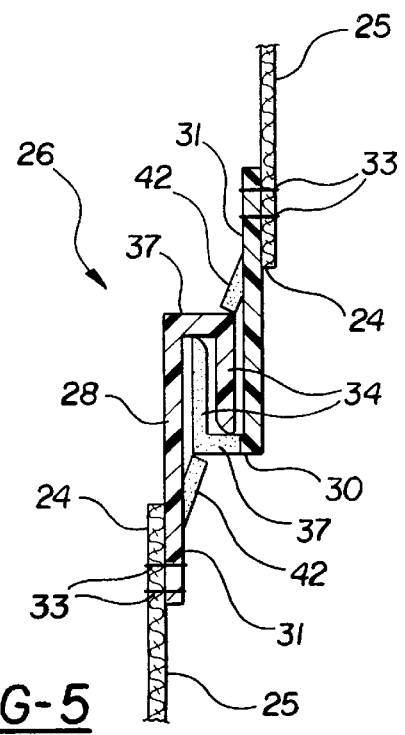
FIG. 5 is an enlarged cross sectional view taken along line 5—5 of FIG. 2.

As best shown in FIGS. 1 and 5, the flat connection section 31 of the outboard portion 28 is sewn by stitches to one of the second ends 24 of the sleeve sheet 20. The stitches formed by the outboard portion 28 and the second end 24 of the intensifier sleeve 17 define a seam 33. Similarly, the flat connecting section 31 of the inboard portion 30 is sewn by stitches to the other second end 24 of the other sleeve sheet 20. The stitches formed by the inboard portion 30 and the other second end 24 of the corresponding sheet 20 likewise define a seam 33. Hence, the seams 33 connect the back panels 32 of the outboard 28 and inboard 30 portions to the respective second edges 24 of the sleeve sheets 20. The outboard 28 and inboard 30 portions may, however, be secured to the respective ends of the intensifier sleeve sheets 20 by any suitable means, including an adhesive, rivets or the like.

A plurality of slots 36 are formed between the hooks 34 to provide separation between adjacent hooks 34. A support rib 38 extends from the back panel 32 to each of the hooks 34 to provide support for the corresponding hook 34 in spaced relationship to the back panel 32. Preferably, the ribs 38 are centrally located on each of the hooks 34. The J-shaped hooks 34 include a base 37 for engaging opposing J-shaped hooks 34 of an opposing back panel 34. It should be appreciated that the exact configuration of the hooks 34 as described above may be modified without deviating from the overall scope of the subject invention.

A mechanical locking device 40 is disposed on at least one of the panels 32 of the portions 28, 30 for locking the outboard 28 and inboard 30 portions together. The locking device 40 includes at least one resilient locking finger 42 extending outwardly from at least one of the opposite ends 35 of the panels 32. Preferably, the locking device 40 includes a resilient locking finger 42 extending from each of the opposite ends 35 at the upper edges of each of the panels 32. Hence, both the outboard 28 and inboard 30 portions include a pair of locking fingers 42. The locking fingers 42 are resiliently formed inwardly toward the J-shaped hooks 34. The particular configuration and number of locking devices 40 may be modified without deviating from the overall scope of the subject invention.

To interconnect the outboard 28 and inboard 30 portions, the J-shaped hooks 34 on the back panel 32 of the outboard portion 28 are interleaved with the J-shaped hooks 34 on the back panel 32 of the inboard portion 30. In particular, the ribs 38 of the outboard portion 28 are disposed in the slots 36 of the inboard portion 30 and similarly the ribs 38 of the inboard portion 30 are disposed in the slots 36 of the outboard portion 28.

Once interlocked, the ribs 38 and slots 36 of the outboard portion 28 are shifted from the ribs 38 and slots 36 of the inboard portion 30 such that the inboard 30 and outboard 28 portions may be locked together. In other words, when a user locks the two portions 28, 30 together, the hooks 34 engage each other and the ribs 38 engage the corresponding slots 36. This rib 38 and slot 36 engagement prevents the inboard 30 and outboard 28 portions from sliding end to end relative to each other. FIGS. 8–11 illustrates various sectional views of the J-shaped hook 34, rib 38, and slot 36.

The locking of the inboard 30 and outboard 28 portions occurs because of the locking fingers 42. Specifically, as a user pushes the two portions 28, 30 together, the corresponding hooks 34 engage each other and the ribs 38 engage the corresponding slots 36. As the corresponding hooks 34 slide into engagement, the fingers 42 are pushed toward the respective back panel 32. Specifically, the hooks 34 of the inboard portion 30 that are directly adjacent the ends 35 push against the fingers 42 of the outboard portion 28. Similarly, the hooks 34 of the outboard portion 28 that are directly adjacent the ends 35 push against the fingers 42 of the inboard portion 30. When the hooks 34 are fully engaged, the fingers 42 snap back into position behind an adjacent hook 34. Specifically, at least one of the fingers 42 of the outboard portion 28 engages one of the bases 37 of the inboard portion 30. Additionally, at least one of the fingers 42 of the inboard portion 30 engages one of the bases 37 of the outboard portion 30. As such, the fingers 42 and the respective hooks 34 cooperate to secure the two portions 28, 30 together. As illustrated in the preferred embodiment, the identical portions 28, 30 are offset when interlocked such that only one finger 42 of each portion 28, 30 engages an opposing base 37. The engaged configuration of the fastener 26 is best shown in FIGS. 2 and 5.

To unlock the inboard portion 30 from the outboard portion 28 the user must bias the fingers 42 toward the back panel 32 to disengage the fingers 42 from the corresponding bases 37.

Referring to FIG. 12, an alternative embodiment of the fastener 26 is shown wherein like numeral increased by 100 indicate like or corresponding parts. The alternative embodiment of FIG. 12 includes a fastener 126, which differs primarily in the configuration of a locking device 140. The alternative locking device 140 includes a resilient locking finger 142 extending from a lower edge of one of an outboard 128 and inboard 130 portion. A notch 144 is formed in the other portion 130, 128 such that the finger 142 engages the notch 144 during the locking of the portions 128, 130. The locking finger 142 is preferably provided on the inboard portion 130 that engages the notch 144 within the outboard portion 128. The outboard 128 and inboard 130 portions of this alternative embodiment are therefore dissimilar. Due to the dissimilar nature of this alternative fastener 126, the portions 128, 130 are not reversible and can only be locking together in one way. This design therefore ensures that the fastener 126 is correctly interlocked each and every time.

Preferably, the finger 142 and notch 144 are formed between a plurality of adjacent J-shaped hooks 134. The finger 142 is biased to maintain locking engagement between the outboard 128 and inboard 130 portions. A cam 146 is provided on the locking tab 142 such that the two portions 128, 130 are easy to assemble by hand. In addition, the two portions 128, 130 may be of contrasting colors, such as black and white, respectively, which may assist in determining if the two portions 128, 130 are fully engaged and locked.

To unlock the two portions 128, 130, a user pushes on the finger 142 until the finger 142 disengages the notch 144. The inboard 130 and outboard 128 portions can now be pulled apart.

The invention has been described in an illustrative manner, and it is to be understood that the terminology as used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claimed is:

1. A seat assembly for a vehicle comprising;
   a seat frame,
   a cover covering said seat frame and including at least one seam,
   an air bag unit supported by said seat frame and disposed inside said cover, said air bag unit including an air bag,
   a pair of sheets sandwiching said air bag therebetween, each of said sheets having a first edge connected to said seam of said cover and a second edge supported by said seat frame,
   a fastener having outboard and inboard portions with said outboard portion being connected to one of said second edges and said inboard portion being connected to the other of said second edges, said inboard portion interconnected to said outboard portion to support said second edges on said seat frame, and
   said outboard and inboard portions each including a back panel extending in a strip between opposite ends and at least one J-shaped hook disposed between said opposite ends,
   said seat assembly characterized by a mechanical locking device disposed on at least one of said panels of said portions for locking said outboard and inboard portions together when said J-shaped hook of said outboard portion is interleaved with said J-shaped hook of said inboard portion, whereby said outboard and inboard portions remain locked together during a deployment of said air bag.

2. A seat assembly as set forth in claim 1 wherein each of said back panels have upper and lower edges with said upper edge extending beyond said J-shaped hooks to provide a flat connecting section along said upper edge.

3. A seat assembly as set forth in claim 2 further including a seam connecting said flat connecting sections of said outboard and inboard portions to said respective second edges of said sheets.

4. A seat assembly as set forth in claim 2 wherein each of said inboard and outboard portions include a series of J-shaped hooks.

5. A seat assembly as set forth in claim 4 further including slots separating adjacent J-shaped hooks.

6. A seat assembly as set forth in claim 4 wherein said locking device includes a resilient locking finger extending from said lower edge of one of said panels with a notch formed in said other of said panels such that said finger engages said notch during said locking of said portions.

7. A seat assembly as set forth in claim 6 wherein said finger and said notch are formed between said series of J-shaped hooks.

8. A seat assembly as set forth in claim 5 further including a support rib extending from said back panel and supporting each of said J-shaped hooks in spaced relationship to said back panel.

9. A seat assembly as set forth in claim 8 wherein said support ribs of said outboard portion are disposed in said slots of said inboard portion and said support ribs of said inboard portion are disposed in said slots of said outboard portion when said J-shaped hooks are interleaved with one another.

10. A seat assembly as set forth in claim 9 wherein each of said J-shaped hooks include a base for engaging opposing J-shaped hooks of the opposite back panel.

11. A seat assembly as set forth in claim 10 wherein each of said ribs is centrally located on each of said J-shaped hooks.

12. A seat assembly as set forth in claim 10 wherein said locking device includes a resilient locking finger extending from each of said opposite ends at said upper edges of each of said panels.

13. A seat assembly as set forth in claim 12 wherein at least one of said locking fingers of said outboard portion engages one of said bases of said inboard portion while at least one of said locking fingers of said inboard portion engages one of said bases of said outboard portion during said locking of said portions.

14. A seat assembly as set forth in claim 1 wherein said locking device includes at least one resilient locking finger extending outwardly from at least one of said opposite ends of each of said panels.

15. A seat assembly for a vehicle comprising;

a seat frame, a cover covering said seat frame and including at least one seam, an air bag unit supported by said seat frame and disposed inside said cover, said air bag unit including an air bag, a pair of sheets sandwiching said air bag therebetween, each of said sheets having a first edge connected to said seam of said cover and a second edge supported by said seat frame, a fastener having outboard and inboard portions with said outboard portion being connected to one of said second edges and said inboard portion being connected to the other of said second edges, said inboard portion interconnected to said outboard portion to support said second edges on said seat frame, and said outboard and inboard portions each including a back panel extending in a strip between opposite ends and a plurality of J-shaped hooks disposed in side by side relationship between said opposite ends, said seat assembly characterized by an alignment device disposed on at least one of said outboard and inboard portions to ensure that said J-shaped hooks of said outboard portion are aligned with said J-shaped hooks of said inboard portion when said J-shaped hooks are interleaved with each other.

16. A seat assembly as set forth in claim 15 wherein each of said back panels have upper and lower edges with said upper edge extending beyond said J-shaped hooks to provide a flat connecting section along said upper edge.

17. A seat assembly as set forth in claim 16 wherein said alignment device further includes slots separating adjacent J-shaped hooks.

18. A seat assembly as set forth in claim 17 wherein said alignment device further includes a support rib extending from said back panel and supporting each of said J-shaped hooks in spaced relationship to said back panel.

19. A seat assembly as set forth in claim 18 wherein said support ribs of said outboard portion are disposed in said slots of said inboard portion and said support ribs of said inboard portion are disposed in said slots of said outboard portion when said J-shaped hooks are interleaved with one another, thereby preventing said sliding movement of said inboard and outboard portions.

20. A seat assembly as set forth in claim 19 wherein each of said J-shaped hooks include a base for engaging opposing J-shaped hooks of the opposite back panel.

21. A seat assembly as set forth in claim 20 wherein each of said ribs is centrally located on each of said J-shaped hooks.

22. A seat assembly as set forth in claim 20 further including a mechanical locking device disposed on at least one of said panels of said portions for locking said outboard and inboard portions together, whereby said outboard and inboard portions remain locked together during a deployment of said air bag.

23. A seat assembly as set forth in claim 22 wherein said locking device includes at least one resilient locking finger extending outwardly from at least one of said opposite ends of each of said panels.

24. A seat assembly as set forth in claim 22 wherein said locking device includes a resilient locking finger extending from each of said opposite ends at said upper edges of each of said panels.

25. A seat assembly as set forth in claim 24 wherein at least one of said locking fingers of said outboard portion engages one of said bases of said inboard portion while at least one of said locking fingers of said inboard portion engages one of said bases of said outboard portion during said locking of said portions.

26. A seat assembly as set forth in claim 22 wherein said locking device includes a resilient locking finger extending from said lower edge of one of said portions with a notch formed in said other of said portions such that said finger engages said notch during said locking of said portions.

27. A seat assembly as set forth in claim 26 wherein said finger and said notch are formed between said plurality of J-shaped hooks.

28. A seat assembly as set forth in claim 15 further including a mechanical locking device disposed on at least one of said panels of said portions for locking said outboard and inboard portions together.

29. A seat assembly as set forth in claim 28 wherein said locking device includes at least one resilient locking finger extending outwardly from at least one of said opposite ends of each of said panels.

* * * * *

UNITED STATES PATENT AND TRADEMARK OFFICE
CERTIFICATE OF CORRECTION

PATENT NO.    : 6,364,347 B1
DATED         : April 2, 2002
INVENTOR(S)   : Carl J. Holdampf et al.

It is certified that error appears in the above-identified patent and that said Letters Patent is hereby corrected as shown below:

<u>Title page,</u>
Item [73], please correct assignee to read -- Magna Seating Systems, Inc., Aurora, Canada --

Signed and Sealed this

Tenth Day of December, 2002

JAMES E. ROGAN
*Director of the United States Patent and Trademark Office*